United States Patent [19]
Murano et al.

[11] Patent Number: 6,070,711
[45] Date of Patent: Jun. 6, 2000

[54] CONVEYOR CHAIN HAVING A ROLLER HOUSING CYLINDRICAL ROLLERS THEREIN

[75] Inventors: Tetsuya Murano; Hiroshi Nishimura, both of Osaka-fu, Japan

[73] Assignee: Tsubakimoto Chain Co., Osaka, Japan

[21] Appl. No.: 09/037,164

[22] Filed: Mar. 9, 1998

[30] Foreign Application Priority Data

Mar. 10, 1997 [JP] Japan ................................. 9-054705

[51] Int. Cl.⁷ .................................................. B65G 17/00
[52] U.S. Cl. .................... 198/779; 198/838; 198/845; 198/712; 384/565
[58] Field of Search .................... 198/779, 838, 198/845, 712; 384/565

[56] References Cited

U.S. PATENT DOCUMENTS

| | | | |
|---|---|---|---|
| 1,245,147 | 10/1917 | Harris et al. | 384/565 |
| 2,244,422 | 6/1941 | Guba | 198/845 |
| 3,701,413 | 10/1972 | Leahy et al. | 198/779 |
| 4,049,308 | 9/1977 | Martin | 198/845 |
| 5,143,205 | 9/1992 | Fujimoto | 198/779 |

FOREIGN PATENT DOCUMENTS 4-78523  12/1992  Japan .
6-58334  3/1994  Japan .

*Primary Examiner*—William E. Terrell
*Assistant Examiner*—Joe Dillon, Jr.
*Attorney, Agent, or Firm*—Dann, Dorfman, Herrell & Skillman, P.C.; Henry H. Skillman

[57] ABSTRACT

A conveyor chain having a hollow roller housing (15), an annular series of cylindrical rollers (14A and 14B) therein providing rotation of the hollow roller on an internal bushing (13). Alternate cylindrical rollers (14A) have a pair of cylindrical roller separating retaining rings (17) rotatably fitted over both ends. Intermediate cylindrical rollers (14B) have no cylindrical roller separating retaining rings (17). The retaining rings (17) on the alternate rollers (14A) engage the intermediate cylindrical rollers (14B). The cylindrical bearing surfaces (13A, 15A) are sandwiched between the retaining rings (17) at each end of the rollers (14A) and project toward the outer circumferential surfaces of the cylindrical rollers (14A and 14B). The roller (15) and the bushing (13) have recessed surfaces (15A and 13A) which are spaced from the outer and inner circumferential surfaces of the retaining rings (17).

11 Claims, 2 Drawing Sheets

CONVEYOR CHAIN HAVING A ROLLER HOUSING CYLINDRICAL ROLLERS THEREIN

FIELD OF THE INVENTION

The present invention relates to a roller chain used as a conveyor chain.

BACKGROUND OF THE INVENTION

In the past, in a chain having a hollow roller housing cylindrical rollers therein used as a conveyor chain, a number of cylindrical rollers are disposed with peripheral surfaces circumscribed each other between the outer peripheral surface of a bushing fitted over a connecting pin and the inner peripheral surface of the roller, and the outer peripheral surface of the roller is slightly projected from an upper side and a lower side of a chain link, as disclosed in Japanese Patent Application Laid-Open No. Hei 4-78523.

In the above-described conventional conveyor chain, a number of cylindrical rollers 3 circumscribe on the outer peripheral surface of a bushing 1 and inscribe the inner peripheral surface of a hollow roller 2 for rolling while engaging each other, as shown in FIG. 4. When the hollow roller 2 rotates clockwise relative to the bushing 1 in a direction of arrow, the respective cylindrical rollers roll clockwise. Therefore, in the peripheral surface portion in which the cylindrical rollers 3 engage the adjacent rollers, their rolling directions are opposed to each other, so that when the lubricating function lowers due to the deterioration or leak-out of grease sealed for lubrication of the cylindrical rollers, the frictional resistance increases at the engaging peripheral surface portions between the adjacent cylindrical rollers and such friction may generate a defective rolling. As a result, the hollow roller 2 is not rotated smoothly, and finally, burning caused by frictional heat occurs to an extent that the hollow roller cannot be rotated.

SUMMARY OF THE INVENTION

The present invention solves the aforementioned problem by the arrangement wherein a pair of opposed thrust bearing plates are interposed between opposed inner surfaces of inner plates of the chain link and both end surfaces of the hollow roller, and both end surfaces of cylindrical rollers having an axis parallel with the connecting pin. Furthermore, selected cylindrical rollers have a pair of cylindrical roller separating retaining rings rotatably fitted over the cylindrical roller surface at both ends between said pair of thrust bearing plates. Other cylindrical rollers having no cylindrical roller separating retaining rings alternate with the selected cylindrical rollers in a series surrounding the outer periphery of a bushing fitted over said connecting pin, said cylindrical roller separating retaining rings engaging the outer peripheral surfaces of the cylindrical rollers having no cylindrical roller separating retaining rings. Between said pair of cylindrical roller separating retaining rings, the series of cylindrical rollers is sandwiched between the outer peripheral surface of said bushing and the inner peripheral surface of the roller.

The cylindrical roller separating retaining rings fitted over both ends of the cylindrical rollers engage the outer peripheral surfaces of both ends of the cylindrical rollers having no roller separating retaining rings to retain a separated spacing between the cylindrical rollers in the series, avoiding direct contact of the cylindrical surfaces of the adjacent cylindrical rollers which roll in the direction opposed to each other.

Further, since the cylindrical roller separating retaining rings are rotatably fitted over both ends of the cylindrical rollers, they rotate irrespective of the rolling direction of the cylindrical rollers and are engaged with the outer peripheral surfaces of both ends of the adjacent cylindrical rollers in the series.

BRIEF DESCRIPTION OF THE DRAWINGS

All of the objects of the present invention are more fully set forth hereinafter with reference to the accompanying drawings, wherein.

DESCRIPTION OF THE PREFERRED EMBODIMENT

Figure 1:
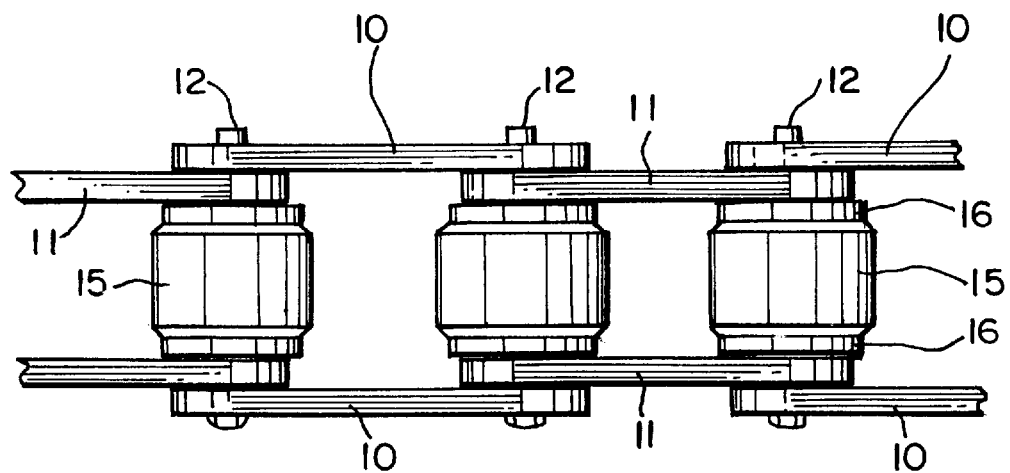
FIG. 1 is a plan view of a conveyor chain made according to the present invention.
Figure 3:
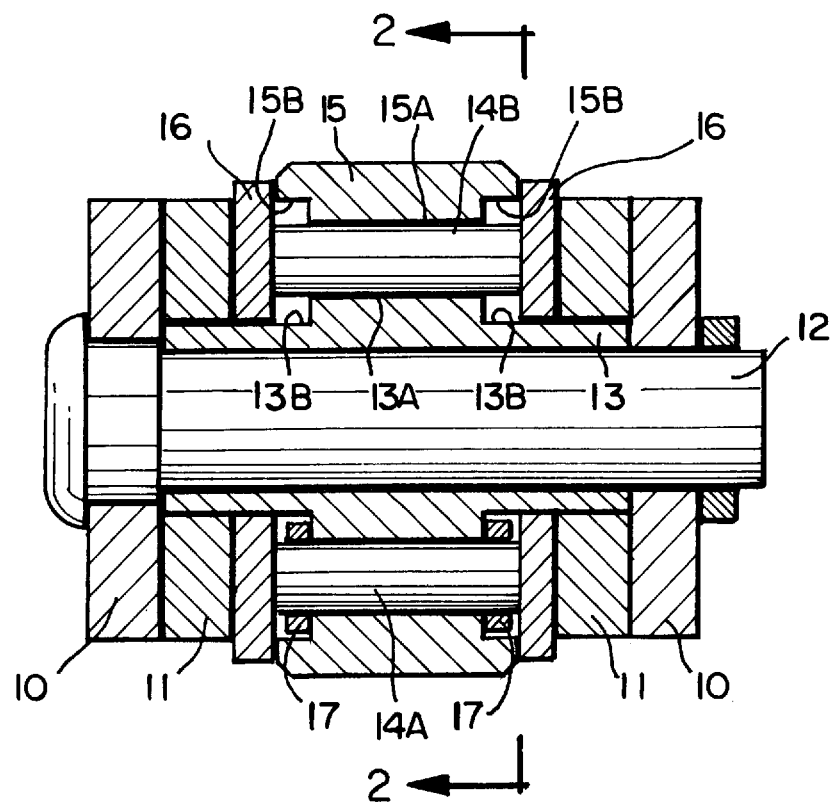
FIG. 3 is a transverse sectional view of the main parts of the conveyor chain shown in FIG. 1; and FIG, 4 is a fragmentary view similar to FIG. 2, illustrating an example of a conventional conveyor chain link.
Figure 2:
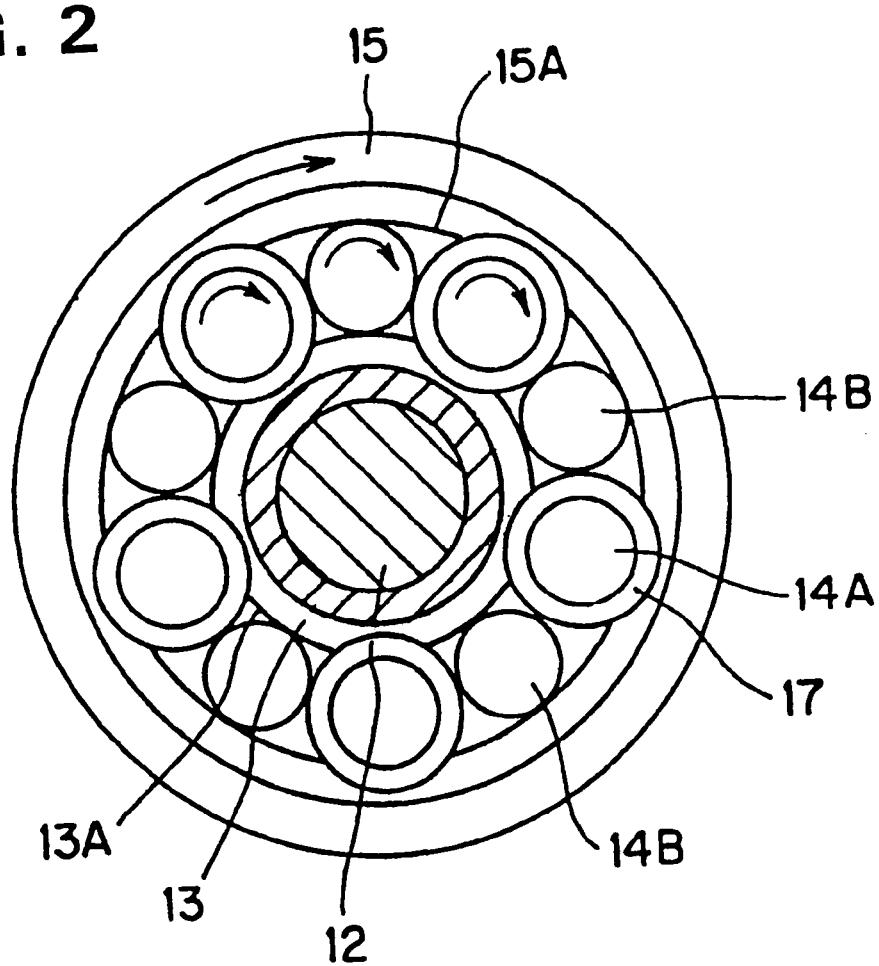
FIG. 2 is a longitudinal sectional view taken on line 2—2 of FIG. 3.
Figure 4:
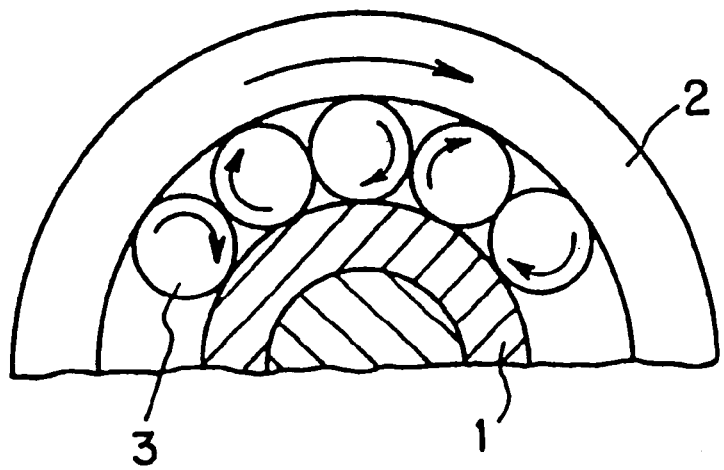

FIG. 1 is a view of a conveyor chain according to the present invention, and FIG. 2 is a longitudinal sectional view (taken on line 2—2 of FIG. 3). FIG. 3 is a transverse sectional view. In the conveyor chain, a pair of outer link plates 10 and inner link plates 11, 11 are connected in a chain-like form as a chain link by means of a connecting pin 12. The link plates are separated to leave a space therebetween to receive a hollow roller 15. The connecting pin 12 has both ends inserted into a bushing 13 which is press-fitted into a connecting pin inserting hole of the inner link plates 11, 11. The roller 15 is rotatably fitted over the bushing 13 by a series of cylindrical rollers 14A and 14B.

Two annular thrust bearing plates 16, 16 are interposed between the opposed inner surfaces of the inner link plates 11, 11 and the end surfaces of the roller 15.

The cylindrical rollers 14A and 14B form an annular series surrounding the bushing 13 and have their rotary axes parallel with the axis of the connecting pin 12 between the pair of thrust bearing plates 16, 16. Cylindrical rollers 14A have a pair of cylindrical roller separating retaining rings 17, 17 slidably mounted, one at each end of the cylindrical surface, for both circumferential and axial displacement relative to the cylindrical roller 14A. Cylindrical rollers 14B have no cylindrical roller separating retaining rings. The rollers 14A and 14B alternate in the annular series. Outer peripheral surfaces of the cylindrical roller separating retaining rings 17, 17 are not in contact with either the outer peripheral surface of the bushing 13 or the inner peripheral surface of the roller 15. To this end, the bushing 13 has a bearing surface portion 13A to engage the cylindrical rollers 14A and 14B and recessed portions 13B extending beyond said bearing surface portion 13A to be spaced inwardly from the rings 17 on the rollers 14A. Likewise, the hollow roller 15 has a bearing surface 15A to engage the annular series of rollers 14A and 14B and recessed portions 15B extending beyond said surface portion 15A to be spaced outwardly from the rings 17 on the rollers 14A. The cylindrical roller bearing surfaces 13A and 15A have a width to be sandwiched between the confronting surfaces of the pair of cylindrical roller separating retaining rings 17, 17. In this way, the rings 17 may float between the bearing plates 16 and the ends of the bearing portions 13A and 15A.

Accordingly, the cylindrical rollers 14A and 14B in the annular series are separated from each other by the cylindrical roller separating retaining rings 17, 17 so that the cylindrical rollers 14A and 14B cannot possibly directly engage one another. Further, since the cylindrical roller separating retaining rings 17, 17 are rotatably fitted over both ends of the cylindrical rollers 14A, even if the cylindrical roller separating retaining rings 17, 17 engage circumscribed on the outer peripheral surfaces at both ends of the adjacent cylindrical rollers 14B, they can be freely rotated in the rotating direction without being restrained by the rotating direction of the cylindrical rollers 14A. Further, since the width of the circumscribed peripheral surface of the cylindrical roller separating retaining rings 17, 17 is extremely small as compared with the case where the peripheral surfaces of the cylindrical rollers 14 are directly engaged, there is less frictional rotational resistance to impede the rotation of the cylindrical rollers 14A and 14B in the same direction.

According to the present invention, since all of the cylindrical rollers 14A and 14B interposed in series between the outer peripheral bearing surface 13A of the 13 bushing and the inner peripheral bearing surface 15A of the roller 15 can be rolled in the same direction without direct engagement between the cylindrical rollers by reason of the separating retaining rings 17, there is no rolling resistance between the cylindrical rollers, and smooth rolling can be retained. Further, since the cylindrical roller separating retaining rings 17 are rotatable on both ends of the cylindrical rollers 14A, even if the cylindrical roller separating retaining rings 17 engage the cylindrical rollers 14B, the width of the cylindrical roller separating retaining rings is extremely small as compared with the length of the cylindrical rollers 14A and 14B so that the rolling resistance is minor, and it is unlikely to cause defective rolling of the cylindrical rollers, and the durability of the conveyer chain also increases.

While a particular embodiment of the invention has been herein illustrated and described, it is not intended to limit the invention to such disclosures, but changes and modifications may be made therein and thereto within the scope of the following claims.

We claim:

1. A conveyor chain link having a connecting pin, a hollow roller housing, a number of cylindrical rollers around said connecting pin, a pair of opposed thrust bearing plates, each interposed between an inner surface of an inner plate of the chain link and an outer end surface of said hollow roller, said cylindrical rollers comprising first cylindrical rollers between said pair of thrust bearing plates, each having an axis parallel with the connecting pin and having a pair of cylindrical roller separating retaining rings rotatably fitted over both ends, and second cylindrical rollers having no cylindrical roller separating retaining rings, said first and second rollers being alternately disposed surrounding the outer periphery of a bushing concentric with said connecting pin, said cylindrical roller separating retaining rings being adapted to engage the outer peripheral surfaces of the cylindrical rollers having no cylindrical roller separating retaining rings, and said hollow roller and bushing having bearing surfaces having a width sandwiched between confronting surfaces of said pair of cylindrical roller separating retaining rings, the outer cylindrical surfaces of said separating rings being projected toward, but spaced from the outer peripheral surface of said bushing and the inner peripheral surface of the roller.

2. A conveyor chain having links with outer link plates, inner plates, a connecting pin pivotally mounting said plates with a roller space between the inner surfaces of said inner plates, a bushing coaxially mounted on said pin in said roller space, and a hollow roller coaxial with and surrounding said bushing between said inner plates, the roller housing a series of cylindrical rollers around said bushing, said cylindrical rollers having rotary axes parallel to the axis of said connecting pin, alternate rollers of said series of rollers having roller-separating retaining rings having inner peripheries rotatably mounted on the cylindrical surfaces of said alternate rollers adjacent opposite axial ends thereof, and outer peripheries of said retaining rings adapted to confront the intermediate rollers of said series on diametrically opposite sides of said alternate rollers, said hollow roller and said bushing having cylindrical bearing surface portions engaging the cylindrical surface of each roller of said series.

3. A conveyor chain according to claim 2, wherein the radial thickness of said retaining rings is less than the radial thickness of said cylindrical bearing surface portions of the hollow roller and the bushing.

4. A conveyor chain according to claim 2, said hollow roller having recessed end portions extending in the axial direction beyond said bearing surface portion and circumscribing the ends of said series of cylindrical rollers and the retaining rings thereon, and said bushing having recessed end portions extending in the axial direction beyond said bearing surface portion and inscribed within the ends of the series of cylindrical rollers and the retaining rings thereon.

5. A conveyor chain according to claim 4 including a pair of thrust bearing plates mounted on the extended end portions of said bushing, said plates projecting radially outward from said connecting pin to engage the opposite axial ends of said series of rollers and the opposite axial ends of said hollow roller.

6. A conveyor chain according to claim 5 wherein said thrust bearing plates are press-fitted to said bushing between said hollow roller and said inner plates.

7. A conveyor chain having links with outer link plates, inner plates, a connecting pin pivotally mounting said plates with a roller space between the inner surfaces of said inner plates, a bushing coaxially mounted on said pin in said roller space, and a hollow roller coaxial with and surrounding said bushing between said inner plates, the hollow roller housing a series of cylindrical rollers around said bushing, said cylindrical rollers having rotary axes parallel to the axis of said connecting pin, alternate rollers of said series of rollers having at least one roller-separating retaining ring having an inner periphery rotatably mounted on the cylindrical surfaces of said alternate rollers between opposite axial ends thereof, and outer peripheries of said retaining rings adapted to confront the intermediate rollers of said series on diametrically opposite sides of said alternate rollers, said hollow roller and said bushing having cylindrical bearing surface portions engaging the cylindrical surface of each roller of said series.

8. A conveyor chain according to claim 7, wherein the radial thickness of said retaining rings is less than the radial thickness of said cylindrical bearing surface portions of the hollow roller and the bushing.

9. A conveyor chain according to claim 7, said hollow roller having at least one recessed portion circumscribing the retaining rings on said series of cylindrical rollers, and said bushing having at least one recessed portion inscribed within the retaining rings on the series of cylindrical rollers.

10. A conveyor chain according to claim 9 including a pair of thrust bearing plates mounted on the end portions of said bushing, said plates projecting radially outward from said connecting pin to engage the opposite axial ends of said series of rollers and the opposite axial ends of said hollow roller.

11. A conveyor chain according to claim 10 wherein said thrust bearing plates are press-fitted to said bushing between said hollow roller and said inner plates.

* * * * *